United States Patent [19]
Napadow

[11] Patent Number: 5,865,293
[45] Date of Patent: Feb. 2, 1999

[54] CONVEYOR PROTECTION SYSTEM FOR FOOD PROCESSING

[75] Inventor: Stanley C. Napadow, Elgin, Ill.

[73] Assignee: New Protectaire Systems, Inc., Bartlett, Ill.

[21] Appl. No.: 735,214

[22] Filed: Oct. 22, 1996

[51] Int. Cl.⁶ .................................................. B65G 45/22
[52] U.S. Cl. .......................................................... 198/495
[58] Field of Search ...................................... 198/493–495

[56] References Cited

U.S. PATENT DOCUMENTS

| | | | |
|---|---|---|---|
| 2,271,436 | 1/1942 | Lathrop | 198/495 |
| 4,207,833 | 6/1980 | Napadow | 198/495 |
| 4,993,538 | 2/1991 | Norbury | 198/495 |
| 5,372,242 | 12/1994 | McInnes et al. | 198/495 |

*Primary Examiner*—Joseph E. Valenza
*Attorney, Agent, or Firm*—Fitch, Even, Tabin & Flannery

[57] ABSTRACT

A protection system for a conveyor for items, such as food items, is provided to keep the conveyor free from bacteria and other contaminants which may accumulate and build-up on the conveyor track and track traversing components. The protection system includes a shroud surrounding the conveyor to which pressurized, bacteria-free air is fed. A preferred bacteria removal unit is a filtration unit to filter bacteria from the ambient air. Herein, a combination filter and blower unit is disclosed which finely filters ambient air, preferably down to 3 microns, and pressurizes the air and blows it into an air manifold connected to the shroud by a series of air ducts. The shroud walls cooperate to form a slot through which the meat hangers can extend and for allowing the clean air in the shroud to be continually flowed therethrough and circulated around the conveyor components. A cleaner, such as a steam cleaner, can be located at a predetermined position along the track between the unloading and loading stations for the meat transported by the conveyor. The protection system herein advantageously keeps the conveyor clean and sanitized during conveyor operations without requiring costly conveyor shutdowns for cleaning and maintenance.

19 Claims, 3 Drawing Sheets

CONVEYOR PROTECTION SYSTEM FOR FOOD PROCESSING

FIELD OF THE INVENTION

The invention relates to a protection system for conveyors and, more particularly, to an apparatus and method for providing a clean air conveyor for conveying products, such as food items, to keep the conveyor free from bacteria and other contaminants.

BACKGROUND OF THE INVENTION

The present invention is directed to providing a clean, protected environment for a conveyor and can be used in many industries and is not limited to use in only the food industry which will be described hereinafter as the preferred industry for use of the invention. In food processing plants, such as in slaughterhouses and smokehouses, overhead conveyor systems are utilized to carry meat or poultry carcasses to various locations around the path of the conveyor. In these plants, the environment in which the conveyors operate can be quite severe with climates in such plants having sub-zero freezing temperatures and the climates of others being the opposite extreme with the conveyors being subjected to extremely high heat and temperatures. Typically, the conveyors include a track and track traversing components or elements such as rollers in engagement with the track driven by a chain drive for traversing the track. Also, extending from the rollers are meat hangers for the food items with the meat hangers carrying the carcasses on their lower hook end around to workstations along the conveyor path and above the floor of the processing plant. Chain lubricators are also commonly provided along the conveyor path for maintaining proper lubrication of the chain and rollers.

When the conveyors are run exposed in hot environments, the lubrication oil or grease that is used can thin in viscosity to the point where it drips from the conveyor down onto the work floor or directly onto the product being conveyed. With food conveyors, this is particularly undesirable as it is very important to keep the work area clean and sanitized and to prevent any contamination of the food product conveyed. Further, loss of lubrication can strain and wear the conveyor components as they are driven around the track and eventually lead to premature failure of these elements. Similarly, when the conveyors are operated in cold environments, the lubrication will tend to increase in viscosity and gum up which can cause binding of the conveyor transversing components. Binding of conveyor components is undesirable in that it can create erratic and jerky movements of these components as they are driven around the conveyor track instead of the desired smooth rolling engagement of properly lubricated rollers on the conveyor track for their rolling movement around the track.

It is important that the conveyor remain clean and free from contaminants to insure reliable conveyor performance and prevent microorganisms, such as bacteria, from accumulating thereon which could contaminate the meat carried by the hangers. The presence of bacteria and other contaminants on the conveyor components is undesirable and a considerable amount of production time and cost is encountered in shutting down the conveyor and sanitizing the conveyor. Also, a build-up of contaminants can cause deterioration and binding of the chain and roller bearings which can eventually lead to breakdown of these components generating expensive repairs and downtime. As discussed earlier, when the conveyors are utilized in harsh temperature environments, these problems can be exacerbated. For these reasons, frequent shutdowns of the conveyors are required for sanitizing the conveyor with disinfectants and for the maintenance thereof. Such shutdowns are undesirable from an economic standpoint as the operating efficiency of the conveyor is reduced and labor efficiency is decreased as during downtime workers cannot do the work required at their stations along the conveyor path and additional workers are required for a maintenance crew for cleaning the conveyor.

Thus, it is desirable that the periodic shutdowns currently required for washing, cleaning and maintenance of overhead conveyors be reduced or substantially eliminated for more efficient conveyor operation. In this regard, it is known to utilize spray cleaning for directing cleaning fluid at the exterior of food processing equipment. However, spray cleaning is generally not practical for overhead conveyors for conveying meat carcasses as described above primarily because the cleaning fluid that is sprayed at the conveyors can drip down onto the meat. Also, use of the cleaning fluid would require an expensive waste disposal system to properly handle the waste effluent generated from such a cleaning process. Thus, there is a need for a system for cleaning and sanitizing overhead conveyors in use in food processing plants which avoids the extensive conveyors shutdowns for sanitizing as currently required and reduces the occurrence of breakdowns in the conveyor components and does not risk contaminating the meat with cleaning solution or require waste disposal.

SUMMARY OF THE INVENTION

The present invention is a protection system for a conveyor utilized for conveying items, such as food, in a predetermined path as defined by the track of the conveyor. The protection system is effective in keeping the conveyor substantially free from build-up of contaminants and adherence of bacteria to conveyor elements, such as the chain, bearings and rail. The invention accomplishes this while the conveyor is in operation thereby reducing or eliminating shutdowns required for conveyor cleaning and maintenance due to bacteria and contaminant build-up on conveyor components. In addition, the protection system provides the conveyor with smoother running operations since contaminants which can cause binding of the conveyor track transversing components are prevented from accumulating on the conveyor components and the conveyor is isolated or insulated from the environment of the room in which it is operated.

The protection system includes the provision of a shroud about the conveyor track and extending along the conveyor path with the walls of the shroud defining a slot through which the conveyor hanger elements extend for carrying the meat carcasses thereon. Pressurized, bacteria-free air is supplied into the shroud and flows out through the slot for the hangers to keep the interior of the shroud and specifically the area in the immediate vicinity of the conveyor track at a pressure higher than that of the air exterior of the shroud thus preventing air and any contaminants exteriorly of the shroud from entering through the slot and accessing the track and conveyor elements in the interior of the shroud. In this manner, the conveyor is kept substantially free of bacteria that could build up on the track and conveyor elements and cause contamination of food products. The protection system includes a bacteria removal unit for removing bacteria from the ambient air and keeping the conveyor in a substantially bacteria-free environment. The bacteria removal unit is preferably a filter unit that filters the bacteria from the incoming ambient air, but can also be a unit that kills bacteria, such as an ozone unit, that kills bacteria in the incoming ambient air. Thus, the protection system herein continuously flows pressurized, filtered bacteria-free air around the conveyor. Such bacteria-free area is also introduced into the workplace through the slot in the shroud. The present system is particularly well adapted to be utilized for cleaning food carrying conveyors in that it prevents the build-up of contaminants on the conveyor components and keeps the conveyor clean and substantially bacteria-free.

In food processing plants, the conveyors are designed to take an endless path with the carcasses loaded on the hangers at a first point in the path, then being carried to various work stations around the path, and returned to a removal station where the carcasses are removed and the free hangers travel back to the first point in the endless path to be loaded with additional carcasses. In this set-up, the preferred form of the protection system is that the shroud is provided so that it extends around the entire length of the track in the endless path so that the entire conveyor is surrounded by a zone of continuously flowing, bacteria-free air. The filtered, pressurized air is circulated through the shroud and out from the hanger slot and down towards the work stations to provide sanitized air to the work areas below the track. In addition, a conveyor cleaning unit, such as a steam cleaner, can be provided at a predetermined position along the track path with the steam cleaner being operable whenever the conveyor is running so that as the conveyor elements which traverse the conveyor track pass the steam cleaner, they will be subject to high pressure and temperature steam which will further sanitize the conveyor elements by destroying bacteria that may be adhered thereto.

In a preferred form of the invention, the track has a rectangular configuration with parallel, longitudinally-extending sections which are joined at either end of the sections by shorter transversely-extending sections. A blower unit and an air supply manifold are provided with the blower unit pressurizing the ambient air drawn in through the bacteria filtration unit provided at the intake of the blower unit. The manifold extends between the track longitudinally-extending sections in the lengthwise direction, and air feeder ducts connect the manifold to the shroud for feeding the filtered, bacteria-free air at a pressure greater than ambient from the manifold to the shroud at selected locations along the track. Preferably, the ducts can be selectively open or closed to maintain the air pressure substantially equalized throughout the shroud. In addition, the manifold can be tapered down from the outlet of the blower unit so that air velocity and pressure is maintained substantially equal throughout its length.

Another aspect of the invention is a method for maintaining a bacteria-free environment around the track of a conveyor for food items by finely filtering ambient air to remove contaminants such as bacteria therefrom, directing the filtered air to predetermined locations along the track, maintaining the filtered air in the immediately surrounding vicinity of the track at a pressure greater than that of the ambient air, and continuously flowing the pressurized filtered air through the immediately surrounding vicinity of the track to keep the track in a substantially bacteria-free environment and to remove any contaminants therefrom.

DETAILED DESCRIPTION OF THE PREFERRED EMBODIMENT

Figure 1:
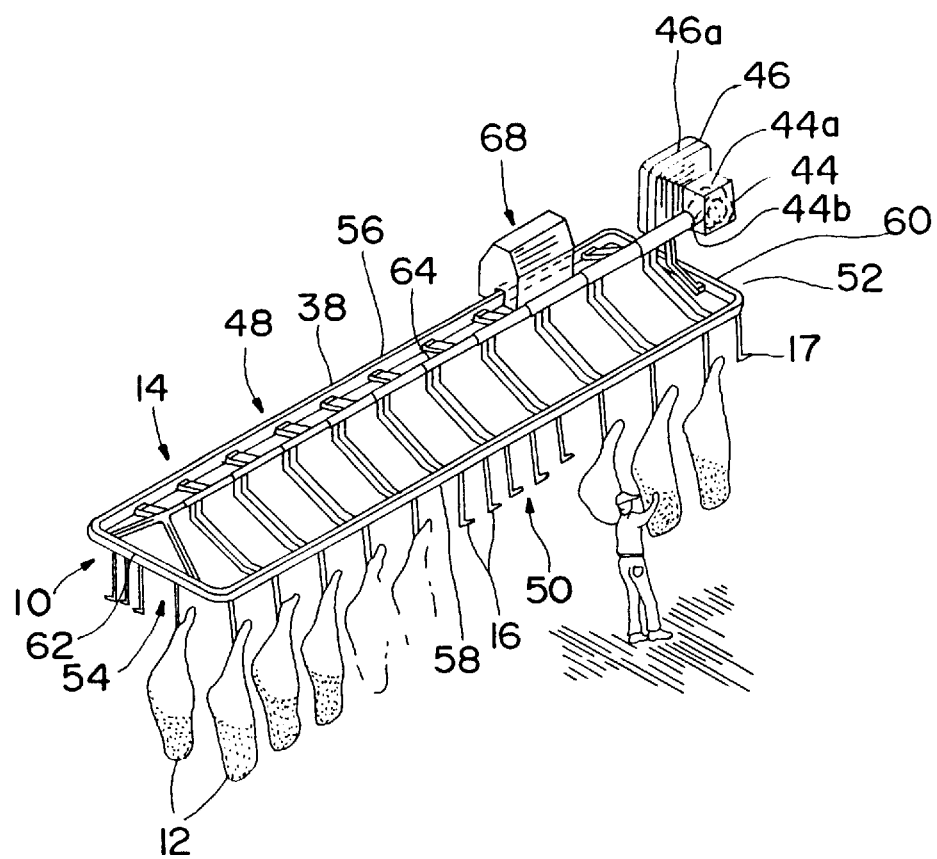
FIG. 1 is a perspective view of a protection system utilized with an overhead conveyor for food items in accordance with the present invention.

In FIG. 1, a conveyor 10 for carrying food items 12, such as meat carcasses, and a protection system 14 for keeping the conveyor 10 clean are illustrated. The conveyor 10 carries the food items 12 by way of hangers 16 having upturned ends or hooks 17 on which the meat carcasses are supported as they traverse the path of the conveyor 10 to workstations therealong. Components of the conveyor 10 include a track 18 and track traversing elements 20 which can be driven along the track 18 by a motorized chain or the like (not shown). More specifically, the track 18 can be in the form of an I-beam rail 22 having upper and lower flanges 24 and 26 joined by a vertically-extending web 28 intermediate the ends of the flanges 24 and 26. Conveyor rollers 30 and 32 driven along the track rail 22 by the drive chain are in engagement with the inner sides of the flanges 24 and 26 on either side of the central web 28. A yoke member 34 can be attached to roller axles 30a and 32b and at the bottom of the yoke 34 a pendant 36 can be provided for connecting to the hangers 16.

The protection system 14 is effective to keep the track 18 and track traversing elements 20, including the roller bearings 30 and 32, yoke member 34, pendant 36 and hangers 16 clean and substantially free from bacteria, as more fully described herein. The food item conveyor 10 can be used in a wide variety of different harsh environments from severe sub-zero temperatures, such as required for freezing of meat carcasses to retard the growth of meat spoilage bacteria, to extremely high temperatures, such as can be found in meat smokehouses. The use of overhead conveyors in these environments can have deleterious effects on the conveyor components. For instance, freezing of the roller bearings and gumming of the lubrication can occur in cold environments, and in hot environments, the lubrication used for the conveyor elements including the chain and roller bearings 30 and 32 can be lowered in viscosity to the point where the lubrication drips from the conveyor elements down onto the hangers and to the meat carried thereby. Conveyor component freezing and loss of lubrication in conjunction with the previously-described contaminant build-up which can happen on unprotected conveyors can cause the track traversing components 20 to bind as they are driven along the track rail 22 which can lead to rapid deterioration of the components. Moreover, any dripping of lubrication onto the plant floor at meat processing workstations or directly onto the meat carried by the hangers can contaminate the meat, rendering the meat product unsalable. Thus, it is desirable to insulate the conveyor 10 from the harsh environment in which it may be used for limiting the previously-described problems that could occur with the conveyor components and their lubrication system and to keep the conveyor free from the buildup of contaminants which may be found in the environment and to limit or prevent the accumulation and adherence of bacteria to the conveyor.

The conveyor protection or cleaning system 14 includes a shroud 38 which, in the preferred and illustrated form, extends around the entire length of the conveyor 10. The shroud 38 is fed pressurized air so that the interior 40 of the shroud 38 and, particularly the area in the immediate vicinity of the conveyor track 18, is kept at a pressure which is higher than that of the air pressure exterior of the shroud 38. High pressure air is continually fed to the shroud interior 40 so that the track 18 and track-engaging elements 20 are kept surrounded by a zone of high pressure, substantially bacteria-free air which is circulated through the shroud interior 40 and out from a slot or gap 42 formed in the shroud 38 and through which the meat hangers 16 extend. In this manner, air and other contaminants exterior of the shroud 38 can only access the track 18 and track traversing elements 20 through the slot 42. However, such access is substantially impeded by the air flow from the shroud interior 40 through the slot 42 to the exterior thereof and the pressure differential between the high pressure interior of the shroud and relatively low pressure exterior of the shroud 38. In addition, the high pressure air blown into and through the shroud interior 40 can be effective in dislodging any contaminants or particulate matter built up on the conveyor and carrying the dislodged particulate matter in the air flow current out of the shroud 38 and through the shroud slot 42. Preferably, the air supplied to the shroud 38 is drawn from the ambient outside from the room in which the conveyor is operated so as to insulate the conveyor with warmer air when operated in cold rooms, or conversely, to insulate the air with relatively colder air when the conveyor is used in hot rooms. In this manner, the problems occasioned by use of conveyors exposed to these cold or hot environments is substantially obviated. Thus, by use of the protection system 14 herein, the conveyor 10, including the track 18 and track traversing elements 20 are isolated from the harsh temperatures in which the conveyors may be operated and are maintained in a substantially clean state as any build-up of contaminants thereon is substantially prevented by limiting access of the outside environment into the protection shroud 38 surrounding the conveyor 10 and continually recirculating high pressure air through the shroud 38 to dislodge contaminants built-up on the track 18 and track elements 20.

The shroud 38 is provided with pressurized air by positive pressure means in the form of blower 44 to which a bacteria removal unit 46 is connected at its intake 44a. The bacteria removal unit 46 finely filters the ambient air drawn in through the blower intake 44a to remove any contamination in the air for providing substantially clean air into the shroud interior 40. Preferably, the bacteria removal unit 46 includes air filter elements 46a which remove airborne particulates of a size greater than 3 microns. One known bacteria unit 46 which can be used with the protection system 14 herein is the Luwa™ FP Ultrafilter which is effective to remove small particulates down to 3 microns, such as bacteria, from the ambient air drawn in through the intake 44a of the blower unit. Other bacteria removal units can be used, such as bacteria killing systems like an ozone generator unit that applies ozone to kill bacteria in the air.

As stated previously, the conveyor 10 can have an endless path formed by the track 18 for carrying the food items or meat carcasses 12 to workstations around the conveyor endless path. Manifestly, it will be appreciated that the present invention can be adapted for use with a wide variety of conveyor configurations with the conveyor 10 illustrated in the Figures and described below being an example of a conveyor configuration for which the invention is well suited. In the illustrated conveyor 10, the track 18 has a substantially rectangular configuration with two parallel longitudinally-extending sections 48 and 50 which form the long sides of the rectangle and shorter, transversely-extending sections 52 at either end of the longitudinal sections 48 and 50 for connecting the ends of the longitudinal sections 48 and 50 together for forming the endless path. With the rectangular form of the conveyor 10, the shroud 38 can have a matching configuration with long side sections 56 and 58 and short end sections 60 and 62 joining the long side sections 56 and 58 at their respective ends. The shroud 38 can be readily attached to the conveyor track 22 by any number of well-known means, such as clamping, bolting, or the like.

Figure 2:
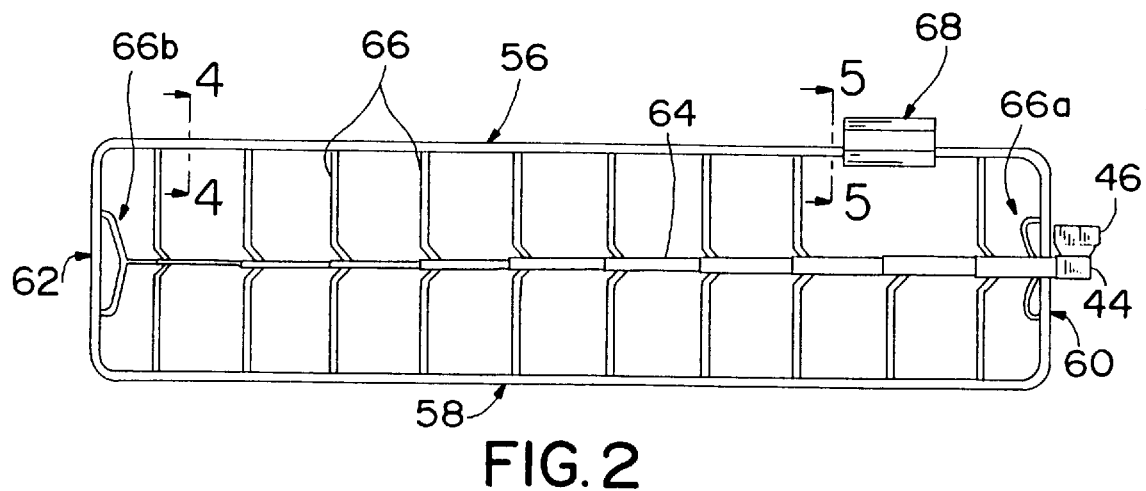
FIG. 2 is a plan view of the protection system showing the shroud for encompassing the conveyor track and including an air manifold supplied with pressurized, bacteria-free air by a filter and blower unit and ducts for supplying the filtered, pressurized air from the manifold to the shroud and a steam cleaner positioned along the conveyor path.
Figure 4:
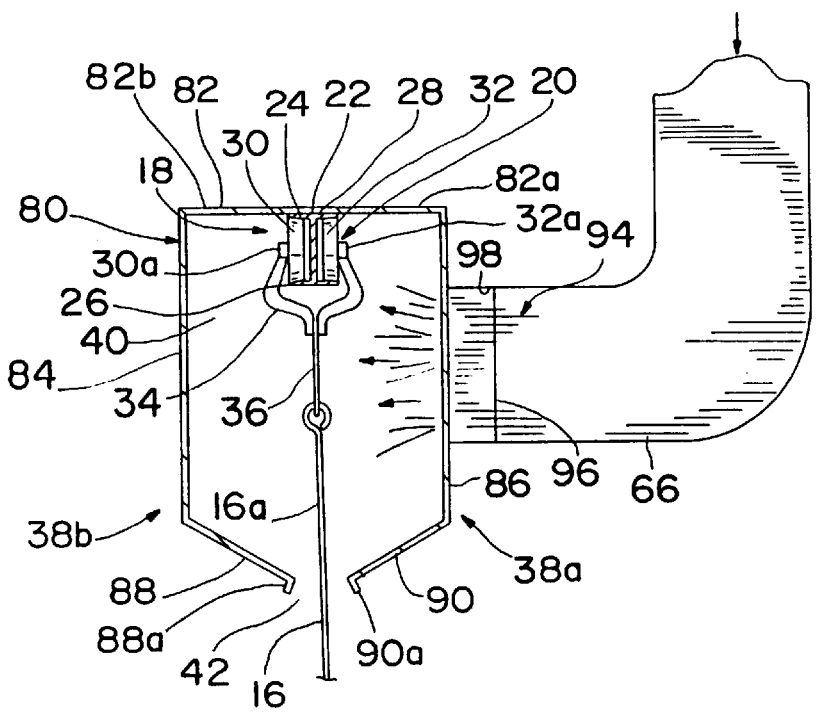
FIG. 4 is a front sectional view taken along line 4—4 of FIG. 2, showing one of the ducts feeding pressurized air into the shroud in which the conveyor track and conveyor elements are contained.

To supply pressurized, filtered air to the rectangular shroud 38, an air manifold 64 is provided which extends from the blower outlet 44b proximate the end section 60 towards the end section 62 in the longitudinal direction between the long side sections 56 and 58 of the shroud 38, as best seen in FIG. 2. Thus, air drawn in through the bacteria removal unit 46 and filtered through its filter elements 46a to remove bacteria from the ambient air and pressurized through the blower unit 44 is blown and directed down along the length of the air manifold 64. Air feeder ducts 66 extend from the manifold 64 to the shroud 38 at predetermined locations around the track 18. Referring to FIG. 4, the filtered, pressurized air is fed from the ducts 66 into the shroud interior 40 so as to surround the conveyor track 18 and track traversing elements 20, such as the rollers 30 and 32, yoke member 34, pendant 36 and the portion 16a of the hanger 16 in the shroud 38. The pressurized, filtered air continually flows through the shroud interior 40 and out through the hanger slot 42. In this manner, the protection system 14 herein simultaneously surrounds the conveyor 10 with clean, bacteria-free air and also provides sanitized air to the working area below the overhead conveyor 10.

Figure 5:
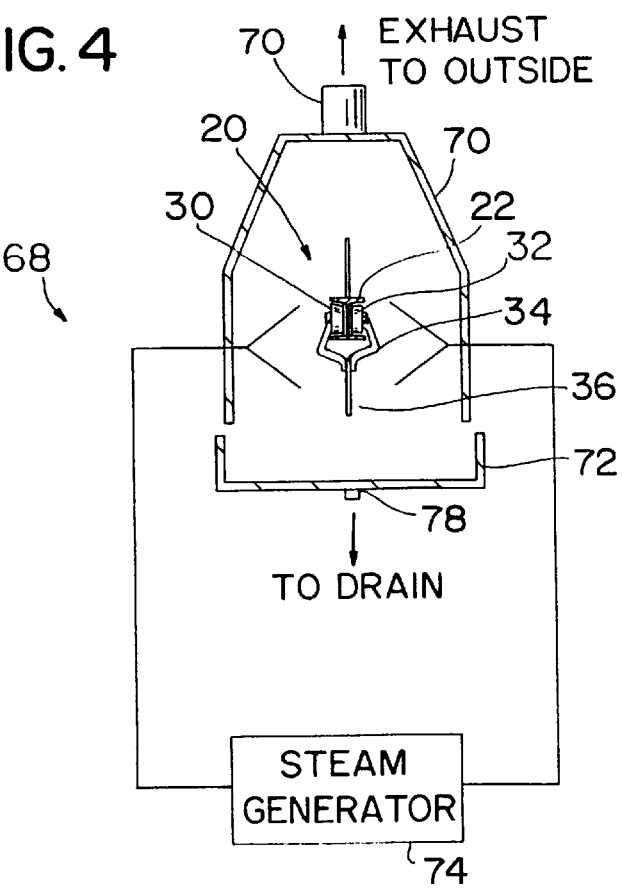
FIG. 5 is a sectional view taken along line 5—5 of FIG. 2 showing the steam cleaner including a steam generator for generating high pressure and temperature steam which is applied to the conveyor.

To further assist in cleaning and sanitizing the conveyor 10, a conveyor cleaner 68 can be provided at a predetermined position along the track path for continuously cleaning the conveyor elements 20 and hangers 16 during conveyor operation by subjecting them to high pressure and temperature steam. One such cleaner which can be utilized with the protection system 14 herein and which is available from Electro-Steam, located at 1000 Bernard Street, in Alexandria, Va. 22314, can provide steam to the shroud 38 at pressures of 15 or 20 psi at a temperature of 310° F. Referring to FIG. 5, the steam cleaner 68 can include an exhaust hood 70 and a drain tray 72 therebelow. The exhaust hood 70 is sized sufficiently large so that the conveyor elements 20, including the hangers 16, can pass therethrough and be subjected to steam by steam generator 74, shown schematically in FIG. 5. Preferably, the steam cleaner 68 is positioned after the unloading station and before the loading station so that meat need not be taken off the hanger hooks before they enter the steam cleaner. Steam from the generator 74 is directed at the conveyor 10 and specifically conveyor components 20, including hangers 16 with the high pressure and temperature of the steam being sufficient to kill most bacteria on contact without requiring the use of chemicals. As shown in FIG. 5, the exhaust hood 70 is provided with an exhaust outlet 76 for exhausting excess steam to outside the food processing plant. The drain tray 72 is provided with a drain 78 for removing any liquid that forms from the steam in the hood 70.

Thus, with the present protection system 14, a bacteria-free environment can be maintained along the track 18 by finely filtering ambient air to remove bacteria from the air with the bacteria removal unit 46. The filtered, bacteria-free air is then pressurized by blower 44 and directed through manifold 64 and ducts 66 to predetermined locations along the track 18. The filtered and pressurized air is maintained in the immediate surround vicinity of the track 18 at a pressure higher than that of the ambient air by the shroud 38 which surrounds the track with walls 80. The shroud walls 80 include a top wall 82, parallel sidewalls 84 and 86 depending from either end of the top wall 82, and bottom walls 88 and 90 which extend from respective bottoms of the sidewalls 84 and 86 towards one another, angled downward relative to the horizontal. The shroud 38 can be provided in sections for assembly to the conveyor 10 and can include interior portions 38a adjacent the ducts 66 including sidewall 86 to which bottom wall 90 and top wall portion 82a are attached, and outer portions 38b including sidewall 84 attached to bottom wall 88 and top wall portion 82b. The shroud 38 can be mounted to the conveyor 10 by abutting the free ends of the top wall portions 82a and 82b together and attaching them to the outer, upper side of rail top flange 24 by way of clamping or bolting, as previously described. The top wall portions 82a and 82b should be abutted together over the central web 28 so as to center the shroud sections 38a and 38b around the track rail 22.

The bottom walls 88 and 90 cooperate to form the slot or gap 42 between their respective innermost ends 88a and 90a through which the hangers 16 extend. In addition, the bottom walls 88 and 90 cooperate to funnel the pressurized air in the shroud interior 40 down through the slot 42 so that the pressurized filtered air is continuously circulated through the immediately surrounding vicinity of the track 18. In this manner the track is kept in a substantially bacteria-free environment and the continuously flowing pressurized air can remove any contaminants that may build-up on the track 18 and the track traversing elements 20.

It is important that the filtered air be kept at a relatively consistent pressure at all areas along the track 18 in the shroud 38 so that air equally escapes from the shroud slot 42 along its entire extent and any excessive air leakage from particular points along the track 18 is avoided. In this regard, it is also important to maintain the air pressure in the air manifold 54 substantially the same while taking into account the velocity head losses created by the air flow as the pressurized air exits the blower outlet 44b and travels down along the manifold. In addition, pressure losses from the blower outlet 44b occur due to the air being fed from the manifold to the shroud 38 by the ducts 66 which are generally arranged in pairs along the length of the manifold 64. As illustrated, one of the ducts 66 of a pair of ducts extends from the manifold to one of the shroud side sections 56 and the other duct 66 of the pair of ducts extends oppositely to the other side section 58. In this manner, both longitudinally-extending sections 48 and 50 of the track 18 are fed filtered, pressurized air from the manifold 64. Two pairs of end ducts 66a and 66b are also provided at either end of the manifold 38. The pair of end ducts 66a extending from the manifold 64 proximate the blower outlet 44b to the shroud end section 60 on either side of the manifold provide the area around track transverse section 52 in the shroud 38 with pressurized air from the blower unit 44. Similarly, end duct pair 66b extends from the end of the manifold 64 distal from the blower outlet 44b to the shroud end section 62 on either side of the manifold 64 to provide the track transverse section 54 with pressurized air.

Figure 3:
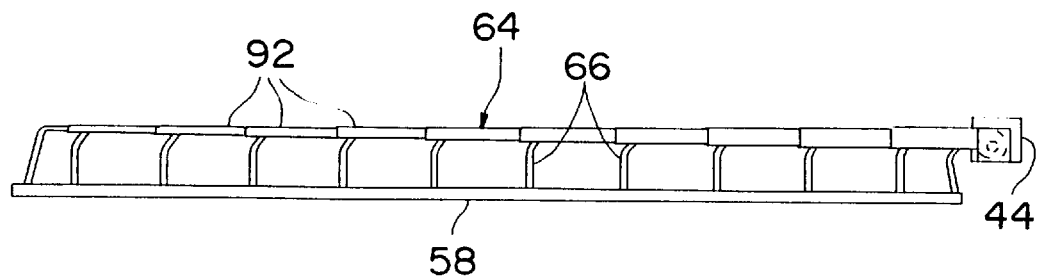
FIG. 3 is an elevational view of the protection system of FIG. 2 showing the ducts extending from one side of the manifold to an elongated side section of the shroud.

To address and counteract the pressure losses due to velocity losses and air take-off by the duct pairs as the air travels down the manifold 64, the manifold can be formed by a plurality of tubular sections 92 which are linearly connected together. Each tubular section 92 can have a diameter slightly smaller than the section which immediately precedes it closer to the blower outlet 44b. Thus, the manifold 64 has an enlarged cross-sectional portion proximate the blower unit outlet 44b in the form of the larger diameter tubular sections 92 thereat which progressively taper down to a narrow cross-sectional portion of the manifold 64 which is distal from the blower unit outlet 44b in the form of the smaller diameter tubular sections 92 at the other end of the manifold further away from the blower outlet 44b, as best seen in FIGS. 2 and 3. In this manner, the manifold 64 tapers or necks down from the blower unit outlet 44b proximate the duct pair 66a to the end of the manifold 64 distal from the blower unit outlet 44b proximate the duct pair 66b so that the velocity head and pressure of the air in the manifold is maintained steady and compensates for pressure losses occasioned by air flow velocity losses and air take-off by the pairs of ducts 66 along the length of the manifold 64.

It is also desirable that the pressurized air flow be able to be controlled so as to be directed to only selected predetermined locations along the track 18. In this regard, the ducts 66 can be each provided with a shut-off mechanism 94 which allows individual feeder ducts 66 to be selectively opened or closed. For example, if a localized low pressure region develops through which excessive air leakage occurs, ducts 66 in the vicinity of this region, such as downstream therefrom, can be closed for forcing air back upstream and increasing the pressure in the low pressure region to equalize pressure throughout the shroud 38 of the protection system 14. In this manner, the air flow through the slot 42 should be made to be constant all around the shroud 38. The shut-off mechanism 94 can take the form of an adjustable damper 96, as seen in FIG. 4. With the adjustable damper 96 placed in the open position, the pressurized air will flow freely into the shroud interior 40 from the manifold 64 and associated feeder duct 66. However, if it is desired to prevent air from flowing from the manifold 64 through a particular duct 66 to its outlet into the shroud interior 40, the damper 96 can be operated to close the air passageway 98 of the duct 66 so as to prevent air flow through the particular duct 66 into the shroud interior 40.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

I claim:

1. A protection system for a conveyor conveying items, the conveyor having an endless track for defining a predetermined endless travel path for the conveyor elements which traverse the path, the conveyor elements including hangers for the items, the conveyor protection system comprising:

a shroud for surrounding the endless track and conveyor elements and extending along the track for the entire length of conveyor travel through a loading station, a work station, and unloading station and a return path to the loading station;

positive pressure means for supplying air into the shroud under a pressure greater than that of the air exterior of the shroud to maintain the track and track traversing conveyor elements surrounded by air throughout their entire length of travel through a loading station, a work station, an unloading station, and return path to the loading station;

walls of the shroud for allowing the pressurized air to exit the shroud at a slot through which the hanger elements travel; and a bacteria removal unit to remove bacteria from the ambient air being supplied by the positive pressure means to supply bacteria-free ambient air in said shroud and about the conveyor elements for the entire length of conveyor travel through a loading station, a work station, and unloading station and a return Path to the loading station.

2. The conveyor protection system of claim 1 wherein the protection system is a food processing system.

3. The conveyor protection system of claim 1 further including a steam cleaner at a predetermined position along the track path for continuously cleaning the track traversing elements and the hangers as they pass the predetermined steam cleaner position in their travel along the track path; and a shroud at the steam cleaner to prevent airborne bacteria from reaching the conveyor.

4. The conveyor protection system of claim 1 wherein the bacteria removal unit comprises air filter elements for removing particulates including bacteria of a size greater than three microns.

5. A protection system for a conveyor conveying items, the conveyor having a track for defining a predetermined travel path for the items and conveyor elements which traverse the path, the conveyor elements including hangers for the items, the conveyor protection system comprising:

a shroud for surrounding the track and conveyor elements and extending along at least a section of the track in the predetermined path;

positive pressure means for supplying air into the shroud under a pressure greater than that of the air exterior of the shroud to maintain the track and track traversing elements surrounded by air;

walls of the shroud for allowing the pressurized air to exit the shroud at a slot through which the hanger elements travel;

a bacteria removal unit to remove bacteria from the ambient air being supplied by the positive pressure means to supply bacteria-free ambient air in said shroud and about the conveyor elements;

the track having a substantially rectangular configuration with substantially parallel longitudinally-extending sections joined at their ends by substantially parallel transversely-extending sections, and the positive pressure means including a blower unit and an air supply manifold extending in the longitudinal direction between the track longitudinally-extending sections and air feeder ducts between the manifold and shroud for feeding the pressurized filtered bacteria-free air from the manifold to the shroud.

6. The conveyor protection system of claim 5 wherein the ducts can be selectively opened or closed to maintain the air pressure substantially equalized throughout the shroud.

7. The conveyor protection system of claim 1 wherein the hangers depend from the track and the slot is formed in the walls at the bottom of the shroud through which the hangers extend.

8. In a conveyor having a rail supporting rollers carrying hangers for items which are transported by the rollers and hangers along the rail, a conveyor cleaner for keeping the conveyor free from bacteria and other contaminants, the conveyor cleaner comprising:

an air filter and blower unit having an inlet and outlet, the unit drawing ambient air though the inlet and finely filtering the ambient air to remove bacteria therefrom and supplying pressurized filtered bacteria-free air to the outlet;

an air supply manifold connected to the outlet of the filter and blower unit;

a steam cleaner shroud; and a steam cleaner within the steam cleaner shroud for cleaning the rollers and hangers with steam to assist the bacteria-free air in keeping the rail area substantially clean and free from bacteria and other contaminants.

9. The conveyor cleaner of claim 8 wherein the shroud has walls which surround the area around the conveyor rail with a gap being formed by the walls through which the hangers extend, and air feeder ducts connected between the manifold and walls of the shroud to provide an air flow path therebetween with the pressurized air continuously flowing from the blower through the manifold and ducts to the interior of the shroud surrounding the area around the rail and out through the gap formed in the shroud walls.

10. The conveyor cleaner of claim 8 including means for substantially equalizing the air pressure in the shroud.

11. A protection system for a conveyor conveying items, the conveyor having a track for defining a predetermined travel path for the items and conveyor elements which traverse the path, the conveyor elements including hangers for the items, the conveyor protection system comprising:

a shroud for surrounding the track and conveyor elements and extending along at least a section of the track in the predetermined path;

positive pressure means for supplying air into the shroud under a pressure greater than that of the air exterior of the shroud to maintain the track and track traversing elements surrounded by air;

walls of the shroud for allowing the pressurized air to exit the shroud at a slot through which the hanger elements travel;

a bacteria removal unit to remove bacteria from the ambient air being supplied by the positive pressure means to supply bacteria-free ambient air in said shroud and about the conveyor elements;

the shroud having walls which substantially surround the area around the conveyor rail;

air feeder ducts connected between the manifold and walls of the shroud to provide an air flow path therebetween; and the pressure equalizing means comprising an enlarged cross-sectional portion of the manifold proximate the outlet of the filter and blower unit which progressively tapers down to a narrowed cross-sectional portion of the manifold distal from the unit outlet and further including shut-off means for allowing individual feeder ducts to be selectively opened or closed.

12. The conveyor cleaner of claim 8 wherein the steam cleaner is located at a predetermined position along the track for subjecting the conveyor rollers and hangers to steam pressure for cleaning the rollers and hangers in their travel along the rail as they pass the predetermined position.

13. A method for maintaining a bacteria-free environment around a track of a conveyor for items, the method comprising:

providing an endless track and a conveyor traveling through a loading station, a work station, an unloading station, and a return path to the loading station;

finely filtering ambient air to remove contaminants, such as bacteria, therefrom;

directing the filtered air to predetermined locations along the endless track;

maintaining the filtered air in the immediately surrounding vicinity of the track throughout the loading station, work station, unloading station and return path at a pressure higher than that of the ambient air; and continuously flowing the pressurized filtered air through the immediately surrounding vicinity of the track to keep the track in a substantially bacteria-free environment throughout the loading station, work station, unloading station and return path.

14. The method of claim 13 including the step of steam cleaning conveyor components in the immediately surrounding vicinity of the track with pressurized steam at a predetermined position along the track.

15. The method of claim 13 wherein the filtered air is maintained in the immediately surrounding vicinity of the track by providing the track with a shroud arranged about the track and into which pressurized filtered air is directed.

16. The method of claim 13 including the step of killing bacteria in the air to remove the bacteria with a killing agent.

17. The method of claim 15 wherein the filtered air is continuously flowed through the shroud and out from the shroud through a slot formed therein and into a room in which the conveyor is operated with the room temperature being substantially different from that of the temperature of the ambient air that is filtered and flowed through the shroud.

18. The method of claim 17 wherein the room is a cold room having a temperature that is lower than that of the ambient air flowed through the shroud.

19. The method of claim 17 wherein the room is a hot room having a temperature that is higher than the ambient air flowed through the shroud.

* * * * *

UNITED STATES PATENT AND TRADEMARK OFFICE
CERTIFICATE OF CORRECTION

PATENT NO. : 5,865,293
DATED : February 2, 1999
INVENTOR(S) : Stanley Napadow

It is certified that error appears in the above-indentified patent and that said Letters Patent is hereby corrected as shown below:

In the Claims:

Column 9, line 13, change "Path" to --path--.

Column 9, line 66, delete "a" (second occurrence).

Column 10, lines 21-22, change "ther-ebetween" to --therebetween--.

Column 10, lines 51-52, change "ther-ebetween" to --therebetween--.

Signed and Sealed this

First Day of June, 1999

Attest:

Attesting Officer

Q. TODD DICKINSON

Acting Commissioner of Patents and Trademarks